United States Patent
Choi et al.

(10) Patent No.: US 12,400,004 B2
(45) Date of Patent: Aug. 26, 2025

(54) PERSONAL INFORMATION SECURITY SYSTEM AND METHOD THEREOF ENSURING IRREVERSIBILITY AND SIMILARITY

(71) Applicants: INDUSTRY FOUNDATION OF CHONNAM NATIONAL UNIVERSITY, Gwangju (KR); OFFICE OF SCIENCE & TECHNOLOGY, VIETNAM NATIONAL UNIVERSITY HO CHI MINH CITY—UNIVERSITY OF SCIENCE, Ho Chi Minh (VN)

(72) Inventors: Deokjai Choi, Gwangju (KR); Mai Thao Dang, Gwangju (KR); Dinh Thuc Nguyen, Ho Chi Minh (VN)

(73) Assignees: INDUSTRY FOUNDATION OF CHONNAM NATIONAL UNIVERSITY, Gwangju (KR); OFFICE OF SCIENCE & TECHNOLOGY, VIETNAM NATIONAL UNIVERSITY HO CHI MINH CITY—UNIVERSITY OF SCIENCE, Ho Chi Minh (VN)

( * ) Notice: Subject to any disclaimer, the term of this patent is extended or adjusted under 35 U.S.C. 154(b) by 197 days.

(21) Appl. No.: 18/093,321

(22) Filed: Jan. 4, 2023

(65) Prior Publication Data
US 2023/0229784 A1    Jul. 20, 2023

(51) Int. Cl.
*G06F 21/62*   (2013.01)
*G06F 21/57*   (2013.01)
*G06F 21/60*   (2013.01)

(52) U.S. Cl.
CPC .......... *G06F 21/577* (2013.01); *G06F 21/602* (2013.01); *G06F 21/6245* (2013.01)

(58) Field of Classification Search
CPC .. G06F 21/577; G06F 21/602; G06F 21/6245; G06F 21/32; G06F 21/60; G06F 21/50; G06F 17/10
See application file for complete search history.

(56) References Cited

U.S. PATENT DOCUMENTS

| | | | |
|---|---|---|---|
| 11,514,918 B2* | 11/2022 | Hahn | G06F 21/6245 |
| 2015/0341349 A1* | 11/2015 | Mandal | G06F 21/32 |
| | | | 726/7 |

(Continued)

FOREIGN PATENT DOCUMENTS

| | | |
|---|---|---|
| JP | 2013-157032 A | 8/2013 |
| KR | 10-1311310 B1 | 9/2013 |

(Continued)

OTHER PUBLICATIONS

O. L. Mangasarian, "Absolute Value Programming", Computational Optimization and Aplications, 1-11 (2006), Springer Verlag, Boston.

*Primary Examiner* — Lynn D Feild
*Assistant Examiner* — Abdullah Almamun
(74) *Attorney, Agent, or Firm* — You & IP, LLC

(57) ABSTRACT

A personal information security system and a method thereof ensuring irreversibility and similarity are proposed. According to specific exemplary embodiments of the present technology, the personal information security system includes a feature vector extraction unit for extracting a feature vector from user modality information, an Absolute Value Equations Transform (AVET) unit for performing absolute value equations transform on the feature vector, and a transformed-template generation unit for generating a transformed template (TT) from which the feature vector is unable to be predicted reversely from a result of the AVET.

15 Claims, 10 Drawing Sheets

(56) References Cited

U.S. PATENT DOCUMENTS

| | | | | |
|---|---|---|---|---|
| 2021/0211290 A1* | 7/2021 | Jindal | .................... | H04L 9/008 |
| 2021/0211291 A1* | 7/2021 | Jindal | ................... | H04L 9/3231 |
| 2022/0294626 A1* | 9/2022 | Lazzouni | ................ | G06F 21/32 |
| 2023/0246839 A1* | 8/2023 | Mathieu | ................ | H04W 12/06 |

FOREIGN PATENT DOCUMENTS

| | | | | |
|---|---|---|---|---|
| KR | 10-2018-0126500 A | 11/2018 | | |
| WO | WO-2019034589 A1 * | 2/2019 | ............. | G06V 10/82 |
| WO | 2019-082988 A1 | 5/2019 | | |

* cited by examiner $$R \quad \begin{array}{|c|c|} \hline 1.14859 & -0.43258 \\ \hline -0.37347 & -0.75870 \\ \hline \end{array}$$

$$A \quad \begin{array}{|c|c|} \hline 1.24737 & 0.28295 \\ \hline 0.69207 & 1.58455 \\ \hline \end{array}$$

$$B \quad \begin{array}{|c|c|} \hline 7.83867e-04 & -2.04739e-01 \\ \hline -7.89178e-01 & -9.10948e-03 \\ \hline \end{array}$$

FIG. 4

$$A \cdot \begin{array}{|c|} \hline u \\ \hline 0.43855 \\ \hline -0.21482 \\ \hline \end{array} + B \cdot \left| R \cdot \begin{array}{|c|} \hline v \\ \hline 0.54304 \\ \hline -0.47817 \\ \hline \end{array} \right| = \begin{array}{|c|} \hline y \\ \hline 0.45415 \\ \hline -0.69382 \\ \hline \end{array}$$

FIG. 5

PERSONAL INFORMATION SECURITY SYSTEM AND METHOD THEREOF ENSURING IRREVERSIBILITY AND SIMILARITY

CROSS REFERENCE TO RELATED APPLICATION

The present application claims priority to Korean Patent Application No. 10-2022-0001192, filed Jan. 4, 2022, the entire contents of which is incorporated herein for all purposes by this reference.

BACKGROUND OF THE INVENTION

Field of the Invention

The present disclosure relates to a personal information security system and a method thereof ensuring irreversibility and similarity and, more particularly, to a technology that enables improving performance of personal information protection and enhancing processing power in the fields such as cancellable biometric security, image retrieval, recommendation systems, data mining, and secure multiparty computation.

Description of the Related Art

Cancellable Biometric (CB) recognition is a biometric encryption method that uses non-changing biometric information but enables the corresponding information to be changeable because when biometric encryption-related information is leaked, damage is also lasting due to exposure of biometric information having permanence.

Random projection (RP) is the most commonly used method in a method of cancellable biometric authentication. The RP is characterized by transforming high-dimensional data into low-dimensional data to increase processing efficiency while maintaining relationships that exist between original data. For this reason, the RP is used as a generic technology in many machine learning algorithms, and is widely used not only in machine learning but also in various fields such as biometric security, image retrieval, content recommendation, multiparty computation, and data mining. However, the RP has a security vulnerability in that the original data may be restored from processed data when a certain condition is satisfied.

Random Projection: $R \cdot x = y$ (when R is m*n and x is n*1, y becomes m*1, where m<n)

That is, the RP is a method of transforming high n-dimensional data x into low m-dimensional data y. The Random projection is widely used in the biometric security, image retrieval, recommendation applications, and the like, because of increasing computational performance by lowering a dimension and at the same time maintaining relationships between data. However, when there are enough R projections, such as $R_1, R_2, \ldots, R_n$, in a system and there exists $y_1, y_2, \ldots, y_n$ accordingly, the fact that original data x may be found in reverse becomes a problem in security.

Such a problem is a security problem that may occur in the fields of not only cancellable biometric security, but also in every field where random projection is applied to a feature vector, such as image retrieval, content recommendation, multiparty computation, and distributed data mining.

In the paper "Absolute Value Programming" submitted by Mangasarian in 2007, it was proved that a GAVE type equation is NP-hard. GAVE means that given A,B,y, it is impossible to find x. However, since the GAVE is vulnerable to linkage attack, a GAVE algorithm may not be used for cancellable biometric authentication and in the fields such as privacy-critical applications, image retrieval, multiparty computation, and recommendation systems.

A general form of GAVE is as follows, meaning that given A,B,y, it is impossible to find x.

GAVE: $A \cdot x + B \cdot |x| = y$

The weaknesses of GAVE are as follows. Since the GAVE is vulnerable to linkage attack, the GAVE algorithm may not be used in the above-mentioned application fields where personal information security is important, including the cancellable biometric authentication. In particular, The reason is that since a security key should be cancellable in the cancellable biometric authentication, multiple pairs of A,B,y are generated.

Consequently, GAVE may not be used as it is, and should be improved for the following reasons. Firstly, the GAVE is vulnerable to linkage attack, and secondly, in the mathematical world, there are research papers that propose various methods and algorithms to solve the problems.

Therefore, a new algorithm capable of overcoming the problems of the RP and the GAVE is required.

DOCUMENTS OF RELATED ART (Patent Document 1) Korean Patent No. 10-1311310 (Sep. 16, 2013)

SUMMARY OF THE INVENTION

An objective of the present disclosure is to provide a personal information security system and a method thereof ensuring irreversibility and similarity to solve a security weakness of a random projection algorithm, which has been widely used for security purposes and to increase processing efficiency.

Another objective of the present disclosure is to provide a personal information security system and a method thereof ensuring irreversibility and similarity to solve a problem of a GAVE algorithm, which is vulnerable to linkage attack in spite of being an NP-hard problem.

However, the problem to be solved by the present disclosure is not limited to the above problems, and other problems could be solved.

According to one aspect of the present disclosure for solving the above problems, there is provided a personal information security system ensuring irreversibility and similarity, the personal information security system including: a feature vector extraction unit for extracting a feature vector from user modality information; an Absolute Value Equations Transform (AVET) unit for performing absolute value equations transform on the feature vector; and a transformed-template generation unit for generating a transformed template (TT) from which the feature vector is unable to be predicted reversely from a solution of the AVET.

In addition, the AVET unit may include: a sub-vector generation module for generating a plurality of sub-vectors by dividing the feature vector into equal sizes; a sampling module for sampling a plurality of parameters; and a transformation module for performing the AVET on the plurality of sub-vectors and the plurality of parameters.

In addition, the AVET may be performed by the following equation.

$$A \cdot u + B \cdot |R \cdot v| = y,  \quad \text{[Equation]}$$

where u and v are the plurality of sub-vectors of the feature vector x, and R·v≠u.

The A, B and R are the plurality of parameters.

The y is a transformed template.

In addition, it may be established that the AVET is an NP-hard problem according to the following condition.

$$u=v+p,$$ [Condition]

where p is a value that can be calculated from a relationship with x, u, and v.

In addition, the personal information security system may further include a similarity preservation determination unit for determining whether to preserve data similarity, when the AVET is performed, according to a similarity between a Euclidean distance before performing the AVET and a Euclidean distance after performing the AVET.

In addition, the sampling module may sample an independent and identically distributed mapping matrix on the basis of a Gaussian distribution.

In addition, when bimodal modality information is used, a feature vector extraction unit may include: a first feature vector extraction module for extracting a first feature vector u from first modality information among the bimodal modality information; and a second feature vector extraction module for extracting a second feature vector v from second modality information among the bimodal modality information, and an AVET unit may include: a sampling module for sampling a plurality of parameters; and a transformation module for performing AVET on the first feature vector, the second feature vector, and the plurality of parameters.

In addition, when multimodal modality information is used, a feature vector extraction unit may include: an integrated feature vector extraction module for extracting an integrated feature vector by generating q feature vectors from q pieces of modality information (where q is a natural number greater than or equal to 3) and concatenating the q feature vectors; a division module for dividing the integrated feature vector into a plurality of sub-vectors; a core tensor generation module for generating a core tensor by using the plurality of sub-vectors on the basis of a fusing algorithm; and a core vector generation module for generating a core vector from the core tensor, and the AVET unit is provided to perform AVET by using the core vector as a feature vector.

According to another aspect of the present disclosure for solving the above problems, there is provided a personal information security method that ensures irreversibility and similarity including: extracting a feature vector from user modality information; performing an Absolute Value Equations Transform (AVET) on the feature vector; and generating a transformed template (TT) from which the feature vector is unable to be predicted reversely on the basis of a result of performing the AVET.

In addition, the performing of the AVET may include: generating a plurality of sub-vectors by dividing the feature vector into equal sizes when the AVE is performed; sampling a plurality of parameters; and performing the AVET on the plurality of sub-vectors and the plurality of parameters.

In addition, the AVET may correspond to the following equation.

$$A \cdot u + B \cdot |R \cdot v| = y,$$ [Equation]

where u and v are the plurality of sub-vectors of the feature vector x, and R·v≠u.

The A, B and R are the plurality of parameters.

The y is a transformed template.

In addition, it may be established that the AVET is an NP-hard problem according to the following condition.

$$u=v+p,$$ [Condition]

where p is a value that can be calculated from a relationship with x, u, and v.

In addition, the personal information security method may further include determining whether to preserve data similarity for the AVET according to a similarity between a Euclidean distance before performing the AVET and a Euclidean distance after performing the AVET.

In addition, sampling of a plurality of parameters may include sampling an independent and identically distributed mapping matrix on the basis of a Gaussian distribution.

In addition, when bimodal modality information is used, the extracting of the feature vector may be provided to include extracting a first feature vector u from the first modality information among the bimodal modality information and extracting a second feature vector v from the second modality information among the bimodal modality information, and the performing of the AVET may include sampling a plurality of parameters and performing the AVET on the first feature vector, the second feature vector, and the plurality of parameters.

In addition, when multimodal modality information is used, extracting a feature vector may include: extracting, by the feature vector extraction unit, a feature vector by generating q feature vectors from q pieces of modality information (where, q is a natural number greater than or equal to 3), concatenating the q feature vectors to generate an integrated feature vector, dividing the integrated feature vector into a plurality of sub-vectors, generating a core tensor by using the plurality of sub-vectors on the basis of a fusing algorithm, and generating a core vector from the core tensor, so that AVET is performed by using the core vector as a feature vector.

According to a yet another aspect of the present invention for solving the above problems, there is provided stored in a computer-readable recording medium in order to execute on a computer an AVET function application method ensuring irreversibility and similarity, the program performing processes including: a first process of extracting a feature vector from user modality information; a second process of applying the Absolute Value Equations Transform (AVET) function to the feature vector; and a third process of generating a transformed template (TT) from which the feature vector is unable to be predicted reversely on the basis of an applied result.

In addition to this, for implementing the present disclosure, another method, another system, and a computer-readable recording medium for recording a cloud-based computer program to execute the method may be further provided.

According to the present disclosure, security capability may be improved by solving a leakage problem, which is the security weakness of RP, not only in the field of biometric security systems to which the existing RP method is applied, but also in the fields including secure image retrieval, distributed data mining, multiparty computation, and recommendation systems for recommending various content such as music and movies.

Since AVET may be used without modifying remaining parts when replacing merely a relevant part in a system to which the existing RP is applied, the system may be easily replaced with a safer biometric security and application system without design change or performance degradation of the already implemented system.

In addition, by dividing a feature vector into a plurality of sub-vectors and adding more parameters, a security level may be improved to be greater than or equal to an NP-hard level while maintaining the form of a GAVE algorithm.

Accordingly, even in a case where data such as a transformed template (TT) or parameters A, B and R used in a process of obtaining the transformed template is stolen by an attacker, the attacker is unable to restore a modality (i.e., a feature vector) of a corresponding user.

The effects of the present disclosure are not limited to the above-mentioned effects, and other effects not described above will be clearly understood by those skilled in the art from the following description.

BRIEF DESCRIPTION OF THE DRAWINGS

FIG. 4 is a view illustrating parameter sampling according to the present disclosure.

FIG. 5 is a view illustrating AVET according to the present disclosure.

DETAILED DESCRIPTION OF THE INVENTION

Figure 1:
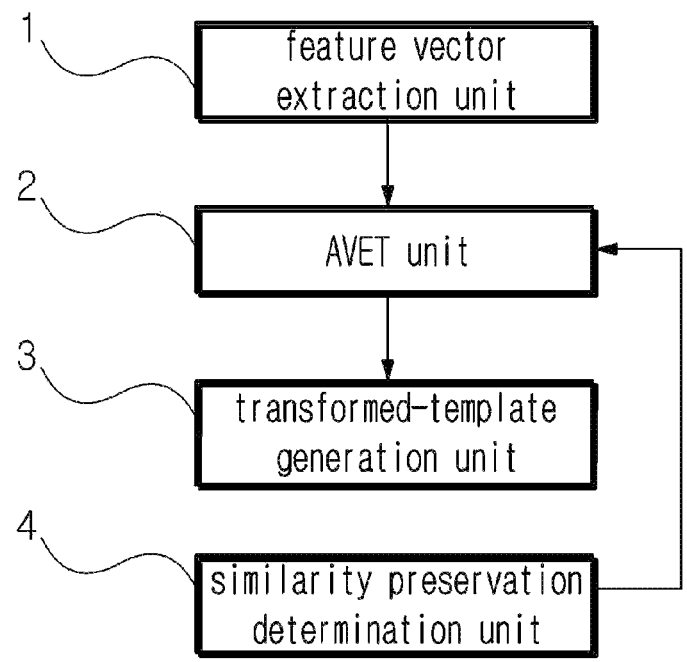
FIG. 1 is a configuration diagram of a personal information security system ensuring irreversibility and similarity according to the present disclosure.

Advantages and features of the present disclosure and the methods of achieving the same will become apparent with reference to an exemplary embodiment described below in detail in conjunction with the accompanying drawings. However, the present disclosure is not limited to the exemplary embodiments disclosed below, but will be implemented in a variety of different forms. These exemplary embodiments are provided only to complete the disclosure of the present disclosure and to completely inform the scope of the present disclosure to those skilled in the art to which the present disclosure pertains, and the present disclosure is only defined by the scope of the claims.

The terminology used herein is for the purpose of describing particular embodiments only and is not intended to be limiting of the disclosure. In this specification, the singular form also includes the plural form unless otherwise specified in the phrase. As used herein, "comprises" and/or "comprising" does not exclude the presence or addition of one or more other components in addition to the mentioned components. Like reference numerals refer to like components throughout the present specification, and "and/or" includes each and every combination of one or more of the mentioned components. It will be understood that, although the terms "first", "second", etc. may be used herein to describe various components, these components should not be limited by these terms. These terms are only used to distinguish one element, from another element. Therefore, it is apparent that the first component mentioned hereinbelow may be the second component within the technical spirit of the present disclosure.

Unless otherwise defined, all terms (including technical and scientific terms) used in the present specification may be used in a sense that can be commonly understood by those skilled in the art. In addition, terms defined in the commonly used dictionary are not ideally or excessively interpreted unless specifically defined.

Hereinafter, the exemplary embodiments of the present disclosure will be described in detail with reference to the accompanying drawings.

Prior to the description, a background technology of the present disclosure will be briefly described. However, it should be noted that the description of the background technology is intended to help the understanding of the present disclosure, and is not used in the sense of limiting the technical spirit of the present disclosure unless explicitly described as limiting the present disclosure.

1) Random projection (RP) may be expressed as Equation 1 below.

$$R \cdot x = y \qquad \text{[Equation 1]}$$

In Equation 1, when R is an m*n matrix and x is an n*1 matrix, y may be transformed to an m*1 matrix (where, m<n). That is, the random projection (RP) is a method of transforming high n-dimensional data x into low m-dimensional data y. Because of increasing computational performance by lowering a dimension and at the same time maintaining relationships between data, the RP is widely used in various fields such as cancellable biometric security, image retrieval, content recommendation, data mining, and secure multiparty computation. However, in the RP, when R is sufficiently many, such as $R_1, R_2, R_3$, and there exists $y_1, y_2, y_3$ correspondingly, there is a security problem that which is original data, may be found in reverse. The reason is that since a security key should be cancellable in the cancellable biometric authentication, multiple pairs are generated, thereby being vulnerable to linkage attack.

2) GAVE may be expressed as in Equation 2 below.

$$A \cdot x + B \cdot |x| = y \qquad \text{[Equation 2]}$$

Since the GAVE is vulnerable to linkage attack, the GAVE algorithm may not be used in cancellable biometric authentication. The reason is that since a security key should be cancellable in the cancellable biometric authentication, multiple pairs of A,B,y are generated.

For example, it is assumed that an attacker may have k pieces of user's security information as shown in Equation 3 below.

$$[(A, B, y)_i]_{i=1}^{k} \qquad \text{[Equation 3]}$$

Assuming a case where modality x is (0,−5,−1,2), a situation in which an attacker tries to obtain x from given information will be described as an example.

Assuming that firstly given information is $$y_1 = (0, 5, 9, -32), A_1 = \begin{bmatrix} 7 & 2 & -4 & -8 \\ -4 & -5 & 8 & -2 \\ 2 & 9 & -1 & 5 \\ -2 & 8 & 4 & -9 \end{bmatrix},$$

$$B_1 = \begin{bmatrix} -3 & 7 & -9 & -2 \\ -6 & -5 & 1 & 8 \\ 2 & 9 & -4 & 1 \\ -1 & 3 & 7 & 4 \end{bmatrix},$$

secondly given information is $$y_2 = (-5, 16, -1, -9), A_2 = \begin{bmatrix} -4 & 6 & -9 & 1 \\ 1 & 2 & -7 & 5 \\ -8 & -3 & -5 & 2 \\ 5 & -8 & 9 & -4 \end{bmatrix},$$

$$B_2 = \begin{bmatrix} -6 & 3 & -3 & 1 \\ 1 & 2 & 9 & -5 \\ -6 & -8 & 7 & 4 \\ 2 & -5 & -1 & -3 \end{bmatrix},$$

and $t=(x_1,x_2,x_3,x_4,|x_1|,|x_2|,|x_3|,|x_4|)$, the attacker may create eight equations in eight unknown variables from this information, and obtain the following solution from the eight equations. $t=(0,-5,-1,2,0,5,1,2)$. In this way, the attacker may easily obtain a user's feature vector $x=(0,-5,-1,2)$.

AVET of the present disclosure maintains NP-hard properties of GAVE. However, the attacker is unable to find x by using a method or algorithm proposed to solve GAVE, and a linkage attack is also impossible for the following reasons.

The AVET divides a feature vector x (for a template) of a modality into two sub-vectors (u,v). Accordingly, the AVET may easily prove that a form $A \cdot u + B \cdot |v| = y$ is also an NP-hard problem by using the GAVE equations. Here, u and v are the sub-vectors of the feature vector x, and u may always be expressed in a form of $u=v+p$. According to such a setting, an equation is established as $A \cdot v + B \cdot |v| = y - A \cdot p$, which is the form of GAVE. As a result of this change, finding of the v value is more difficult than that in the existing GAVE. The reason is that the existing GAVE assumes that a value on the right side of the equal sign was known, but the value $y - A \cdot p$ on the right side of the equal sign is unknown in a modified equation. p has a relationship with u,v, and since u,v are originally provided from the feature vector x and the attacker is trying to find this x, especially p cannot be known. Nevertheless, such a modified equation is also not safe. The reason for this is as follows.

Assuming that a first exposed value is $$y_1 = (-17, -57), A_1 = \begin{bmatrix} -7 & 5 \\ -4 & 8 \end{bmatrix}, B_1 = \begin{bmatrix} 2 & 3 \\ -9 & -4 \end{bmatrix},$$

a second exposed value is $$y_2 = (22, 27), A_2 = \begin{bmatrix} 2 & -5 \\ 1 & -8 \end{bmatrix}, B_2 = \begin{bmatrix} -9 & 3 \\ 1 & -7 \end{bmatrix},$$

and $t=(u_1,u_2,|v_1|,|v_2|)$, an attacker may create an equation to find $t=(0,-5,1,2)$ as a solution. Although the attacker is unable to find exact x because of its absolute value, the attacker may compute a new exact template from t.

In order to solve such a problem, the present disclosure proposes AVET having additional parameter R as shown in Equation 4 below.

That is, since the proposed AVET divides x into u and v, maps R to v, and creates new variables that have nothing to do with X, the number of variables to be found increases whenever a set of information obtained from linkage attack increases, so the number of unknowns is greater than the number of equations, thereby becoming a problem of indeterminate equations. As a result, the proposed AVET has strong characteristics against the linkage attack while maintaining the NP-hard properties.

$$A \cdot u + B \cdot |R \cdot v| = y \qquad \text{[Equation 4]}$$

When k pieces of $\{(R, A, B, y)\_i\}\_(i=1)^k$ are obtained due to hacking or security attack, an attacker may set up k×n equations having (k+1)×n unknowns. For example, it is assumed that vectors $t=|R \cdot v|=(|r\_1 \cdot v|, \ldots, |r\_n \cdot v|)$, where $i=\{1, \ldots, n\}$.

$$\begin{cases} a_{11}u_1 + \cdots + a_{1n}u_n + b_{11}t_1 + \cdots + b_{1n}t_n = y_1 \\ \vdots \\ a_{n1}u_1 + \cdots + a_{nn}u_n + b_{n1}t_1 + \cdots + b_{nn}t_n = y_n \end{cases},$$

In this case, the number of unknowns is 2n and the number of equations becomes n.

In a case of k>1, the attacker may create the following equations.

$$\begin{cases} a_{11}^{(1)}u_1 + \cdots + a_{1n}^{(1)}u_n + b_{11}^{(1)}t_1^{(1)} + \cdots + b_{1n}^{(1)}t_n^{(1)} = y_1^{(1)} \\ \vdots \\ a_{n1}^{(1)}u_1 + \cdots + a_{nn}^{(1)}u_n + b_{n1}^{(1)}t_1^{(1)} + \cdots + b_{nn}^{(1)}t_n^{(1)} = y_n^{(1)} \\ a_{11}^{(k)}u_1 + \cdots + a_{1n}^{(k)}u_n + b_{11}^{(k)}t_1^{(k)} + \cdots + b_{1n}^{(k)}t_n^{(k)} = y_1^{(k)} \\ \vdots \\ a_{n1}^{(k)}u_1 + \cdots + a_{nn}^{(k)}u_n + b_{n1}^{(k)}t_1^{(k)} + \cdots + b_{nn}^{(k)}t_n^{(k)} = y_n^{(k)} \end{cases}$$

These equations are k×n equations having (k+1)×n unknowns, becoming indeterminate equations.

Hereinafter, with reference to FIGS. 1 to 9, the personal information security system ensuring irreversibility and similarity will be described in detail.

Figure 2:
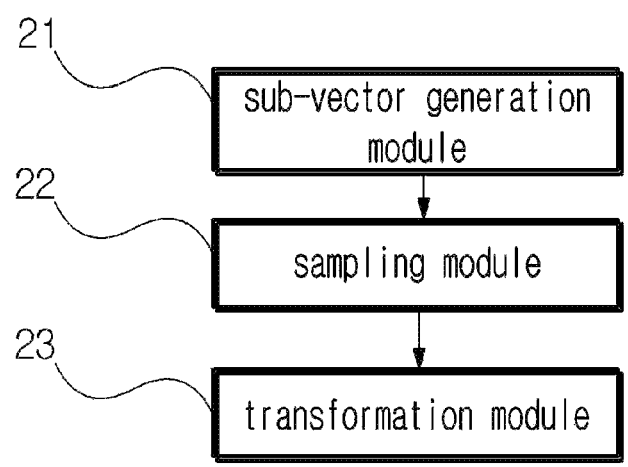
FIG. 2 is a detailed configuration diagram of an AVET unit of FIG. 1.
Figure 3:
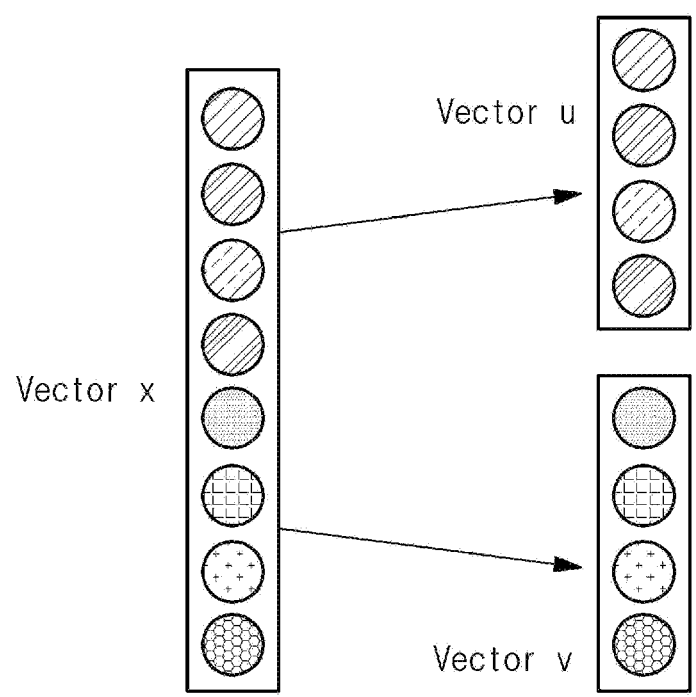
FIG. 3 is a view illustrating feature vector division according to the present disclosure.
Figure 6:
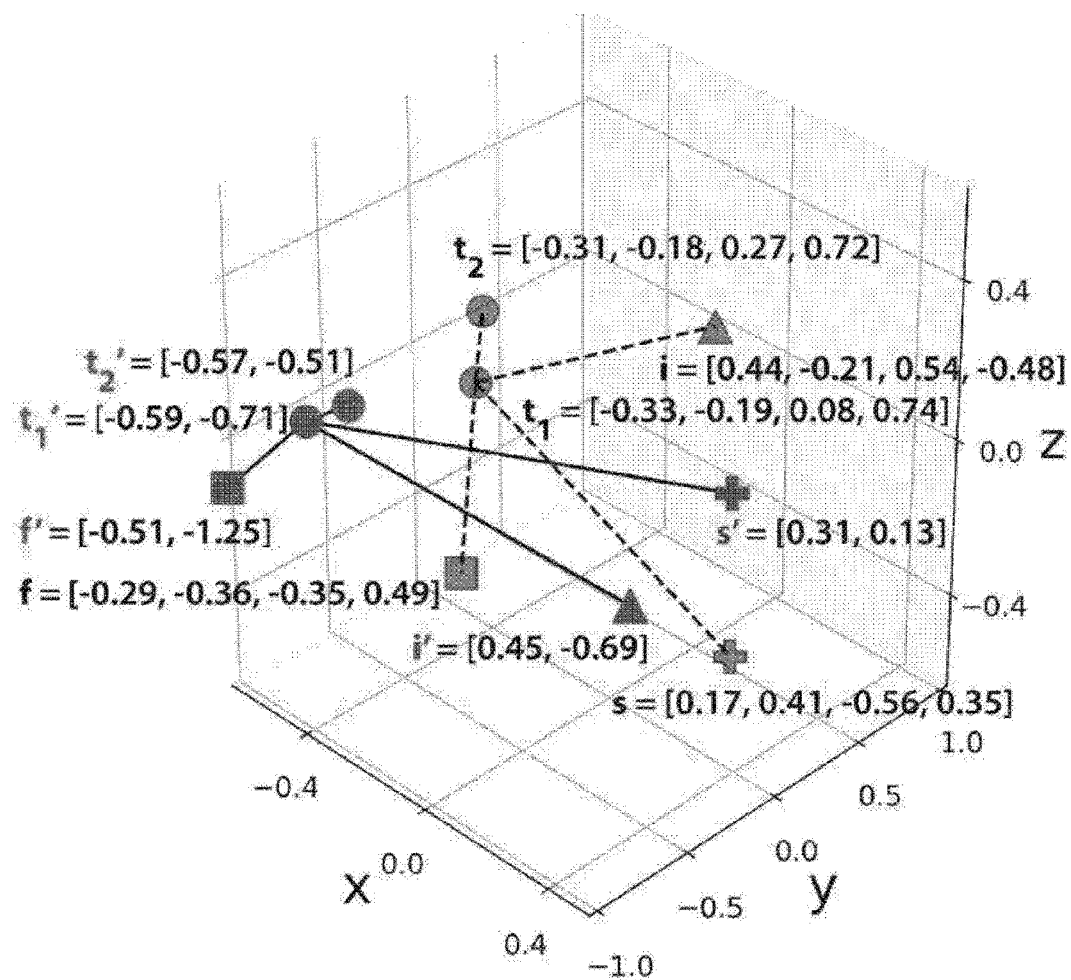
FIG. 6 is a view illustrating information before and after performing the AVET according to the present disclosure.

FIG. 1 is a configuration diagram of the personal information security system ensuring irreversibility and similarity according to the present disclosure. FIG. 2 is a detailed configuration diagram of an Absolute Value Equations Transform (AVET) unit of FIG. 1. FIG. 3 is a view illustrating feature vector division according to the present disclosure. FIG. 4 is a view illustrating parameter sampling according to the present disclosure. FIG. 5 is a view illustrating AVET according to the present disclosure. FIG. 6 is a view illustrating information before and after performing the AVET according to the present disclosure.

The personal information security system ensuring irreversibility and similarity according to the exemplary embodiment will be described with reference to FIGS. 1 to 6.

Here, various devices capable of performing calculation and providing results to a user are all included. For example, the devices may have the forms of computers and mobile terminals. The computers may be in the forms of servers for receiving requests from clients and processing information.

In addition, each computer may include a sequencing device for performing sequencing. Each mobile terminal may include a mobile phone, a smartphone, a personal digital assistant (PDA), a portable multimedia player (PMP), a navigation device, a notebook PC, a slate PC, a tablet PC, an Ultrabook, a wearable device (e.g., a watch type terminal (i.e., a smartwatch), a glass type terminal (i.e., smart glasses), a head mounted display (HMD)), and the like.

Referring to FIG. 1, the personal information security system ensuring irreversibility and similarity according to the exemplary embodiment may include a feature vector extraction unit 1, an Absolute Value Equations Transform (AVET) unit 2, and a transformed-template generation unit 3.

Here, the feature vector extraction unit 1 may extract a feature vector from user modality information. Here, the modality information may include a user's fingerprint, iris, footstep, and face image, but is not limited thereto, and may also include other biometric information capable of identifying a user. Although the present specification is described while focusing on cancellable biometric authentication for convenience of description, it may also be applicable to applications where random projection is applied to feature vectors and privacy is important, that is, be applicable to fields such as image retrieval, multiparty computation, and recommendation systems. In this way, even when applied to fields other than the cancellable biometric authentication, a feature vector may be extracted by using input data such as modality information. "Modality information" and "modality", which are used throughout the present specification, have the same meaning.

The Absolute Value Equations Transform (AVET) unit 2 may perform Absolute Value Equations Transform (AVET) on a feature vector.

In addition, on the basis of an Absolute Value Equations Transform (AVET) result, the transformed-template generation unit 3 may generate a transformed template (TT) from which the feature vector is unable to be predicted.

That is, the feature vector extraction unit 1 may extract a feature vector x from user modality information through a neural network model. Specifically, the neural network model may include a convolutional neural network (CNN). The convolutional neural network is a type of deep neural network and includes a neural network including a convolutional layer. The convolutional neural network is a type of multilayer perceptron designed to use minimal preprocessing. The CNN may be composed of one or more convolutional layers and artificial neural network layers combined with the convolutional layers. The CNN may additionally utilize weights and pooling layers. Owing to such a structure, the CNN may fully utilize input data having a two-dimensional structure. The convolutional neural network may be used to recognize an object in an image. The convolutional neural network may represent and process image data as a matrix having a dimension. For example, in a case of the image data encoded in red-green-blue (RGB), the image data may be represented as a two-dimensional matrix (e.g., in a case of two-dimensional image) for each R, G, and B color. That is, a color value of each pixel of the image data may be an element of the matrix, and a size of the matrix may be the same as the size of the image. Accordingly, the image data may be represented by three two-dimensional matrices (i.e., a three-dimensional data array).

Referring to FIG. 2, the Absolute Value Equations Transform (AVET) unit 2 may include: a sub-vector generation module 21 for generating a plurality of sub-vectors by dividing a feature vector into equal sizes; a sampling module 22 for sampling a plurality of parameters; and a transformation module 23 for performing AVET on the plurality of sub-vectors and the plurality of parameters.

Referring to FIG. 3, the sub-vector generation module 21 divides a feature vector x into two sub-vectors u and v, and may generate a first half of the feature vector x as a sub-vector u and a second half as a sub-vector v. As a result, the two sub-vectors u and v are used as respective input data of the transformation module 23. The u and v are the plurality of sub-vectors of the feature vector X, where $R \cdot v \neq u$. The A, B and R are the plurality of parameters. The y is a transformed template.

In addition, a fact that the AVET of Equation 4 is an NP-hard problem may be established according to a condition corresponding to Equation 5 below.

$$u = v + p, \qquad \text{[Equation 5]}$$

where p is a value that can be calculated from a relationship with x,u,v. Specifically, x is given, a first half of x is u, and a second half of x is v, so p is a value that can be calculated in a relationship between X, u, and v.

Specifically, in $x = u \| v$, u is a string having a length of the first half of x, v is a string having a length of the second half of x, and $\|$ is a string concatenation operator. When these elements are converted into a numerical value, p for which Equation 5 holds true can be found.

According to the above condition, Equation 4 can be re-expressed as an equation in a GAVE form of $A \cdot v + B \cdot |R \cdot v| = y - A \cdot p$. Accordingly, it may be confirmed that AVET may also be an NP-hard problem, and it may be confirmed that a security level of the AVET function is a minimum NP-hard level.

In the above, it has been described that two sub-vectors are generated by dividing the feature vector x into equal sizes, but three or more sub-vectors may be generated by dividing the feature vector into different sizes according to exemplary embodiments.

In sampling the plurality of parameters, the sampling module 22 may sample an independent and identically distributed (iid) mapping matrix on the basis of a Gaussian distribution. That is, the plurality of parameters A, B and R may be sampled to follow the independent and identically distribution from the Gaussian distribution. As shown in FIG. 4, the A, B and R may be randomly selected.

In addition, a concept of k-secure matrix may be applied to select the parameter A,B. Since the k-secure matrix is a well-known technology, a detailed description thereof will be omitted.

In this way, when the sub-vectors and parameters are determined, the transformation module 23 may generate a transformed template TT by performing AVET corresponding to Equation 4 on the determined sub-vectors and parameters.

As shown in FIG. 5, by using the sub-vectors u and v generated in the sub-vector generation module 21 and the parameters A,B and R sampled in the sampling module 22, AVET may be performed by the transformation module 23 through Equation 4 above, so as to calculate a y value (i.e., a transformed template, TT).

In addition, z (i.e., a protection template, PT) may be obtained by applying a protection function to the generated transformed template, and be stored in a storage system. The protection function used to generate the protection template PT may be a Sign function and an Index-of-max function, but is not limited thereto.

Thereafter, new modality information to be verified is input to obtain a feature vector x', and AVET is performed on the feature vector x' to obtain an intermediate vector TT'. In addition, before performing the AVET, the same protection function is applied to TT' to obtain z'. For verification (i.e., authentication), a Euclidean distance between the two vectors z and z' is calculated, and the calculated distance value is compared with a predefined threshold value to determine whether the verification is done or not.

Accordingly, the exemplary embodiment may further include a similarity preservation determination unit 4 for determining whether to preserve data similarity, when the AVET is performed, according to a similarity between a Euclidean distance before performing the AVET and a Euclidean distance after performing the AVET. That is, when the Euclidean distances before and after performing the AVET are similar to each other, it may be determined that AVET has characteristics of data similarity preservation.

As shown in FIG. 6, it may be seen that the y value calculated through the AVET by using the feature vector x extracted from the modality information has no significant difference from that of the feature vector x before performing the AVET. Specifically, it may be seen that a length ratio with respect to a distance between $t_1$ and $t_2$, a distance between $t_1$ and i, a distance between $t_1$ and s, and a distance between $t_1$ and f is similar to a length ratio with respect to a distance between $t_1'$ and $t_2'$, a distance between $t_1'$ and i', a distance between $t_1'$ and s', and a distance between $t_1'$ and f'. Accordingly, it may be seen that even when a feature vector is mapped to another domain by using AVET, the AVET preserves data similarity.

In the above, the case of using single-modality information has been described, but according to the exemplary embodiments, the present disclosure may use a bimodal or multimodal modality. Referring to Equation 5, in the case of a single modality, as described above, the u and v are the sub-vectors of the feature vector x. In the case of the bimodal modality, u and v are feature vectors obtained from each piece of modality information, and in the case of the multimodal modality, u and v are sub-vectors of a feature vector x obtained through fusing. In addition, in the case of the single modality and the multimodal modality, p in Equation 5 is a value calculated from a relationship between x, u, and v, whereas in the case of the bimodal modality, p is a value calculated from a relationship between u and v.

Figure 9:
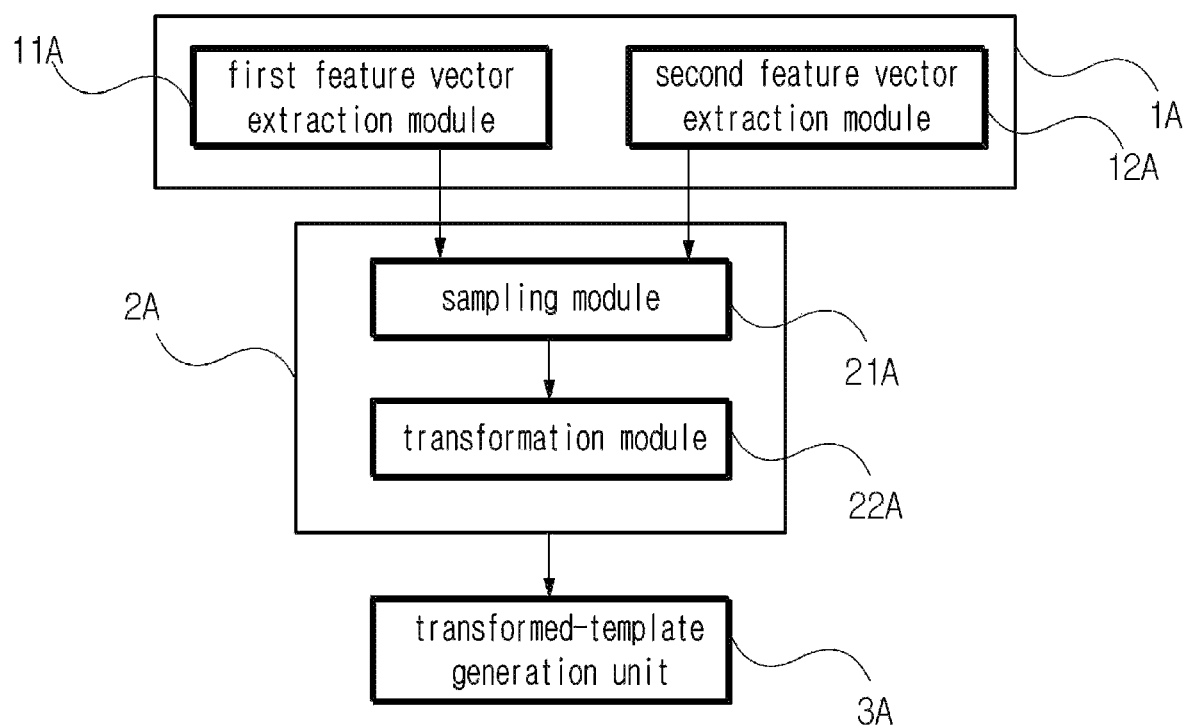
FIG. 9 is a configuration diagram of a personal information security system ensuring irreversibility and similarity by using bimodal modality information according to another exemplary embodiment of the present disclosure.

FIG. 9 is a view illustrating a configuration of the personal information security system ensuring irreversibility and similarity by using bimodal modality information according to another exemplary embodiment. Referring to FIG. 9, the personal information security system ensuring the irreversibility and similarity by using the bimodal modality information according to another exemplary embodiment may include: a feature vector extraction unit 1A including a first feature vector extraction module 11A and a second feature vector extraction module 12A; an AVET unit 2A including a sampling module 21A and a transformation module 22A; and a transformed-template generation unit 3A.

Referring to FIG. 9, the feature vector extraction unit 1A includes the first feature vector extraction module 11A and the second feature vector extraction module 12A, the first feature vector extraction module 11A may extract a first feature vector from first modality information among bimodal modality information, and the second feature vector extraction module 12A may extract a second feature vector from second modality information among the bimodal modality information.

For example, when modality information about a face and modality information about an ear are used dually, the first feature vector for the face may be extracted and used as u and the second feature vector for the ear may be extracted and used as v.

The sampling module 21A samples a plurality of parameters, and then transmits the parameters to the transformation module 22A. The transformation module 22A performs AVET on the first feature vector, the second feature vector, and the plurality of parameters. Specifically, the first feature vector for the face may be used as u and the second feature vector for the ear may be used as v. Thereafter, the parameters are sampled. The transformation module 22A of the AVET unit 2A for performing the AVET on the sampled parameters and the u and v respectively generated bimodally, and the transformed-template generation unit 3A for generating a transformed template by using the AVET-performed parameters and feature vectors are the same as that described for the transformation module 23 of the AVET unit 2 and transformed-template generation unit 3, which are shown in FIG. 1.

Figure 10:
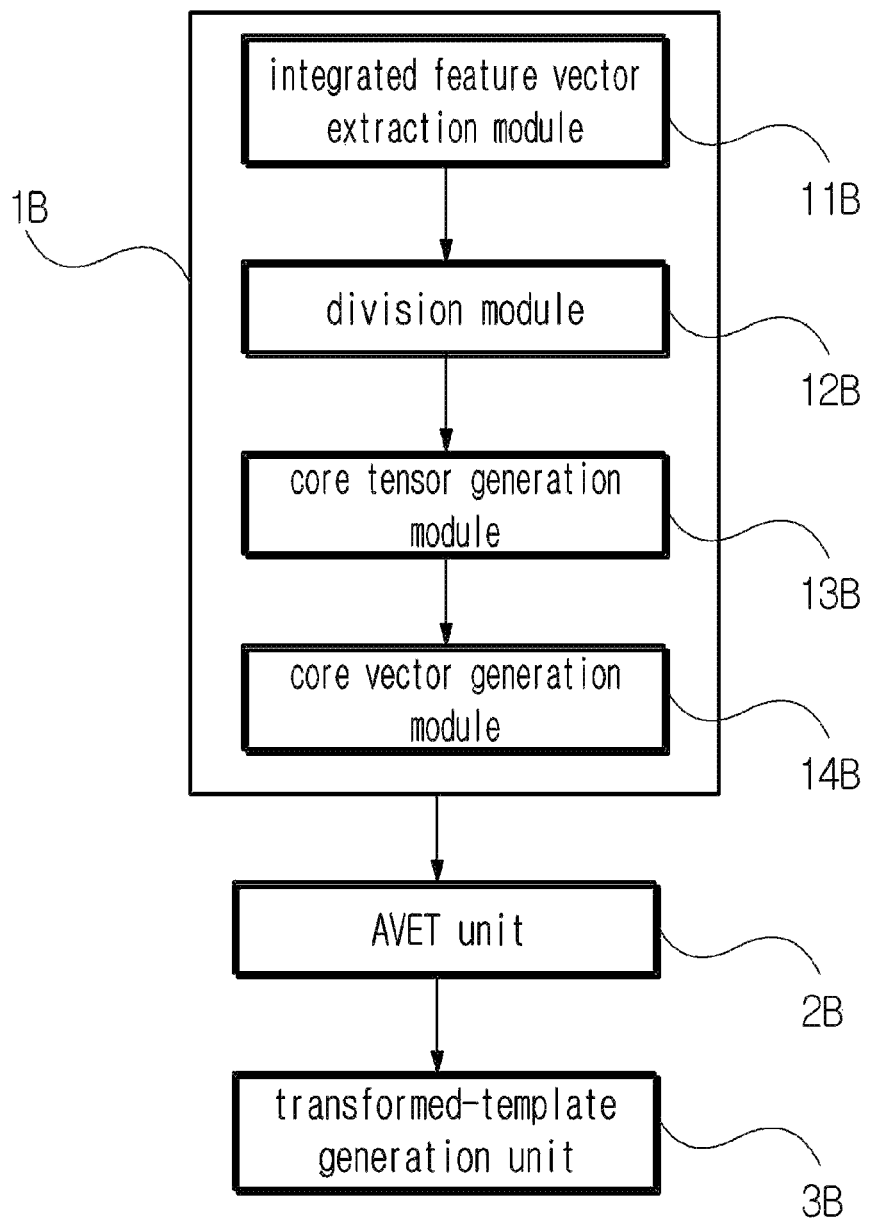
FIG. 10 is a configuration diagram of a personal information security system ensuring irreversibility and similarity by using multimodal modality information according to a yet another exemplary embodiment of the present disclosure.

FIG. 10 is a view illustrating another example of a feature vector extraction unit of a personal information security system ensuring irreversibility and similarity by using multimodal modality information according to a yet another exemplary embodiment. Referring to FIG. 10, the personal information security system ensuring the irreversibility and similarity in a case of using the multimodal modality is provided with a configuration in which feature vectors extracted from each piece of modality information constituting the multimodal modality are simply sequentially concatenated and processed as a feature vector. In this regard, the personal information security system according to the yet another exemplary embodiment may include: a feature vector extraction module 1B including an integrated feature vector extraction module 11B, a division module 12B, a core tensor generation module 13B, and a core vector generation module 14B; an AVET unit 2B; and a transformed-template generation unit 3B.

That is, the integrated feature vector extraction module 11B extracts q feature vectors from q pieces of modality information (where q is a natural number greater than or equal to 3) and concatenates the q feature vectors to generate an integrated feature vector.

In addition, the division module 12B divides the integrated feature vector into a plurality of sub-vectors. Then, for the divided sub-vectors, the core tensor generation module 13B generates a core tensor on the basis of a fusing algorithm (e.g., Tucker tensor decomposition), and for the generated core tensor, the core vector generation module 14B may generate a core vector from the core tensor. Thereafter, the core vector is transmitted to the AVET unit 2 as a feature vector.

Accordingly, in the case of multimodal modality, there is a problem that the size of the integrated feature vector concatenated into one becomes too large and a computational burden increases, so in order to reduce the computational burden, the integrated feature vector concatenated into one is divided into several sub-vectors, the fusing algorithm is applied to the sub-vectors to generate the core tensor, and the core vector is generated from this core tensor, whereby as in the case of processing a feature vector, the AVET function may be applied by using the core vector as a feature vector. The core vector at this stage may be treated as x in single mode. Thereafter, the feature vector x is divided into sub-vectors u and v and the parameters are sampled. The AVET unit 2B for performing AVET on the plurality of sub-vectors and sampled parameters, which are generated respectively, and the transformed-template generation unit 3B for generating a transformed template on the basis of AVET results are the same as described for the AVET unit 2 and transformed-template generation unit 3, which are shown in FIG. 1.

As described above, the AVET of the present disclosure is a safe transformation function capable of replacing random projection that is widely used because of its high efficiency. In the case of a normal state, restoring an original modality by breaking through a protective layer of the AVET is the NP-hard problem. In a worst case, that is, even in a case where A,B,R, and TT are exposed, an attacker may never get an actual modality x. That is, an attempt to break through the AVET is similar to solving an indefinite linear equation, so there exist infinitely many solutions. For this reason, it is impossible for the attacker to know (i.e., recover) the actual values of all entries of the user modality x.

In addition, in a system to which the existing random projection is applied, when merely a corresponding part is replaced, AVET may be applied to the system without modifying the remaining parts of the system, so the system may be easily replaced with a safer biometric security system without design change or performance degradation of the existing system already in place. The AVET may be used in all cancellable biometric recognition (i.e., authentication) methods that use the random projection, which is a core technology and a secure mapping function.

In addition, the AVET of the present disclosure has similarity preservation properties by the following three assumptions.

The first is an element-level similarity assumption. When two feature vectors a and b are close to each other (i.e., similar to each other), respective distances between elements in each pair corresponding to the two vectors are close enough to each other. That is, a condition corresponding to Equation 6 below is satisfied. In such a case, AVET may be said to have similarity preservation properties.

$$|a_i - b_i| < \varepsilon,$$ [Equation 6]

where ε is a small threshold value that is set in a system.

The second is a vector-level similarity assumption. When two feature vectors a and b are close to each other (i.e., similar to each other), a Euclidean distance between the two vectors satisfies a condition corresponding to Equation 7 below. In such a case, the AVET function may be said to have the similarity preservation properties.

$$\|a_i - b_i\| < \varepsilon,$$ [Equation 7]

where ε is a small threshold value that is set in a system.

The third is a hybrid assumption. When two feature vectors a and b are similar to each other, its sub-vectors are also close to each other. In such a case, the AVET function may be said to have the similarity preservation properties.

The case where the present disclosure uses a single modality may be based on the above hybrid assumption, and the case where the present disclosure uses a multimodal modality may be based on the above vector-level similarity assumption. The similarity preservation properties of the AVET of the present disclosure may be proved by using the Johnson-Lindenstrauss lemma, the inverse triangular inequality, and the Cauchy inequality.

Hereinafter, with reference to FIGS. 7 and 8, it will be described that overall topological relationships existing in datasets remain in a stable state even after applying the AVET function of the present disclosure.

Figure 7:
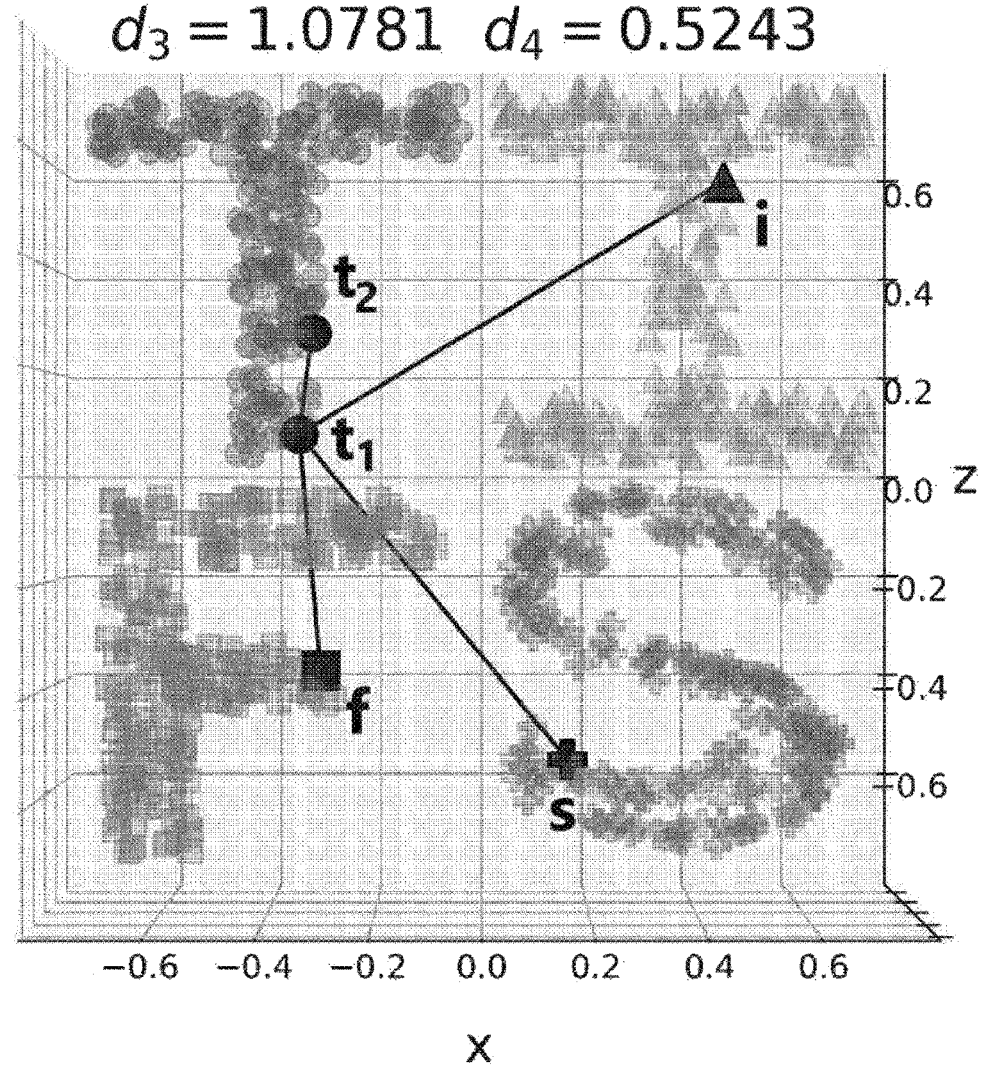
FIGS. 7 and 8 are views illustrating performance of an AVET function according to the present disclosure.
Figure 8:
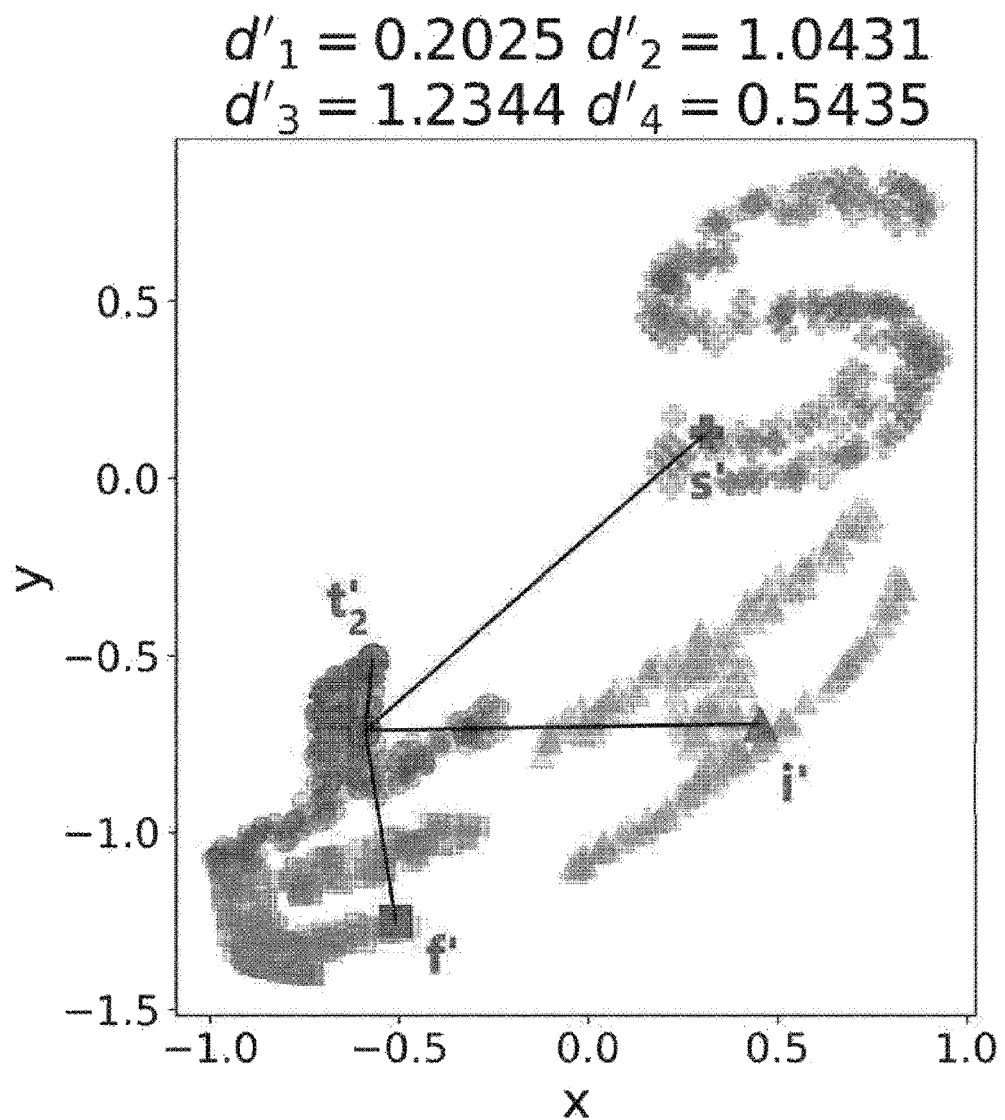

FIGS. 7 and 8 are views illustrating performance of AVET according to the present disclosure.

Referring to FIGS. 6 and 7, assuming that 1000 datasets are given in 4 dimensions, each of "T", "I", "F", and "S" may consist of 250 data points. In this case, it may be known that a Euclidian distance $d_1$ between $t_1$ and $t_2$, a Euclidian distance $d_2$ between $t_1$ and i, a Euclidian distance $d_3$ between $t_1$ and S, and a Euclidian distance $d_4$ between $t_1$ and f are respectively 0.01903, 1.5120, 1.0781, and 0.5243.

Referring to FIG. 8, which is the result of applying AVET to conditions of FIG. 7, it may be known that a Euclidian distance $d_1'$ between $t_1'$ and $t_2'$, a Euclidian distance $d_2'$ between $t_1'$ and i', a Euclidian distance $d_3'$ between $t_1'$ and s', and a Euclidian distance $d_4'$ between $t_1'$ and f', are respectively 0.2025, 1.0431, 1.2344, and 0.5435.

After performing the AVET, it may be seen that although image distortion occurs, the shapes of the transformed characters "T", "I", "F", and "S" in a 2-dimensional space are still maintained to the extent of being recognizable. As a result, it may be seen that the distances between the data points are generally maintained, indicating that recognition accuracy may be maintained at an approximate level even after transformation is performed by using the AVET function.

FIG. 6 illustrates points before and after performing AVET. The black color represents information before performing the AVET, that is, original information, and the red color represents information after performing the AVET, that is, transformed information. As shown in FIGS. 7 and 8, it may be seen that respective $d_1, d_2, d_3$, and $d_4$ are not significantly different from corresponding $d_1', d_2', d_3'$, and $d_4'$.

Figure 11:
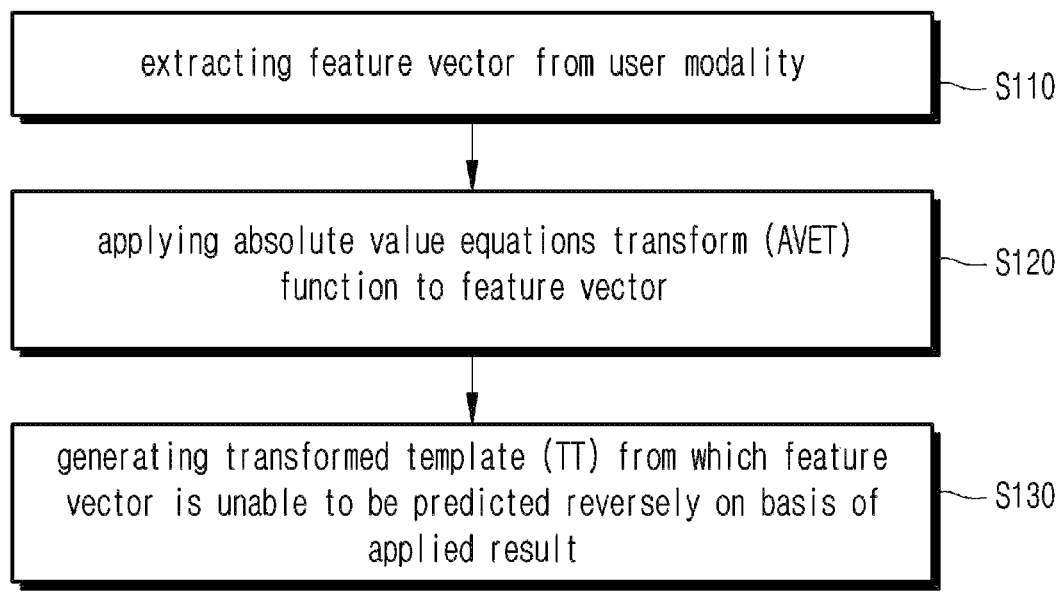
FIGS. 11 and 12 are flowcharts illustrating processes of the personal information security system ensuring the irreversibility and similarity of FIG. 1.
Figure 12:
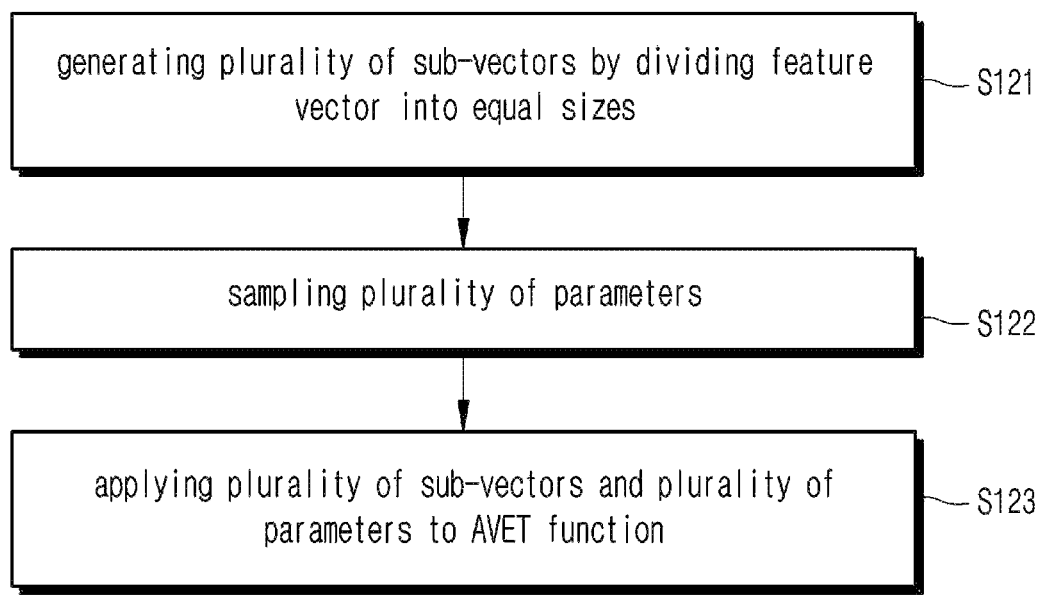

FIGS. 11 and 12 are views illustrating operation processes of the personal information security system ensuring irreversibility and similarity in FIG. 1. Referring to FIGS. 11 and 12, the personal information security processes ensuring the irreversibility and similarity according to another exemplary embodiment of the present disclosure will be described.

Referring to FIGS. 11 and 12, in step S110, a personal information security system ensuring irreversibility and similarity according to an exemplary embodiment extracts a feature vector from user modality information, and in step S120, Absolute Value Equations Transform (AVET) is performed on the feature vector.

In addition, in step S130, the system of the exemplary embodiment may generate a transformed template (TT) from which the feature vector is unable to be predicted on the basis of an applied result.

That is, in step S110, the system may extract the feature vector x from the user modality information through a neural network model.

In step S120, the system may generate a plurality of sub-vectors by dividing the feature vector into equal sizes in step S121, may sample a plurality of parameters in step S122, and may apply the plurality of sub-vectors and the plurality of parameters to an AVET function in step S123.

In step S121, the system of the exemplary embodiment may divide the feature vector x into two sub-vectors u and v, and may generate a first half of the feature vector x as the sub-vector u and a second half as the sub-vector v.

In step S122, in sampling the plurality of parameters, the system may sample an independent and identically distributed (iid) mapping matrix on the basis of a Gaussian distribution.

Meanwhile, in a case of using bimodal modality information, in step S110, a system of an exemplary embodiment may extract a first feature vector from first modality information among the bimodal modality information, and may extract a second feature vector from second modality information among the bimodal modality information. In this case, in step S120, the system of the exemplary embodiment may sample a plurality of parameters and apply the first feature vector, the second feature vector, and the plurality of parameters to an AVET function.

Thereafter, a method of sampling the parameters and applying the u and v, which are respectively generated bimodally, and the sampled parameters to the AVET function is the same as described in steps S122 and S123.

In addition, in a case where multimodal modality is used, in step S110, q feature vectors are extracted from q pieces of modality information (where q is a natural number greater than or equal to 3), the q feature vectors are concatenated to generate an integrated feature vector, the integrated feature vector is divided into a plurality of sub-vectors, a core tensor is generated by using the plurality of sub-vectors on the basis of a fusing algorithm (e.g., Tucker tensor decomposition), and a core vector may be generated from the core tensor. In addition, in step S120, as a feature vector, the core vector may be applied to an AVET function.

FIGS. 11 and 12 describe that steps S110 to S130 and steps S121 to S123 are sequentially executed, but this is merely an example of the technical idea of the present exemplary embodiments, so without departing from the essential characteristics of the present exemplary embodiment, those skilled in the art to which the present exemplary embodiment belongs may change and execute the orders described in FIGS. 11 and 12, or perform steps S110 to S130 and steps S121 to S123 in parallel, so that the present exemplary embodiment may be applicable by modifying and transforming the same in various ways, and thus, FIGS. 11 and 12 are not limited to time-series orders.

Meanwhile, in the above description, steps S110 to S130 and steps S121 to S123 may be further divided into additional steps or combined into fewer steps according to the exemplary embodiments of the present disclosure.

The personal information security method ensuring irreversibility and similarity according to the present disclosure described above may be implemented as a program (or an application) to be executed on a computer, which is hardware, and be stored in a computer-readable recording medium.

The above-described program may include a code that is coded in a computer language such as C, C++, JAVA, Ruby, Python, and machine language that can be read by a processor (CPU) of the computer through a device interface of the computer in order for the computer to read the program and execute the methods implemented as the program. Such a code may include a functional code related to a function and the like defining features necessary for executing the above methods, and may include a control code related to an execution procedure necessary for the processor of the computer to execute the features according to a predetermined procedure. In addition, such a code may further include: additional information necessary for the processor of the computer to execute the features; and a code related to memory reference indicating which location (i.e., address address) that the media is to be referenced in the internal or external memory of the computer. In addition, when the processor of the computer needs to communicate with any other computer or server in a remote location in order to execute the features, the code may further include a communication related code on how to communicate with any other remote computer or server by using a communication module of the computer, and on what information or media should be transmitted and received during communication.

The above medium for storage is not a medium that stores data for a short moment, such as a register, a cache, a memory, and the like, but a medium that stores data semi-permanently and a medium readable by a device. Specifically, examples of the medium for storage include a ROM, a RAM, a CD-ROM, a magnetic tape, a hard disk, a flash memory, a floppy disk, and an optical data storage device, and the like, but are not limited thereto. That is, the program may be stored in various recording media on various servers accessible by a computer or in various recording media on the computer of the user. In addition, the media may be distributed in a computer system connected to a network, and a computer-readable code may be stored in a distributed manner.

The above description of the present disclosure is for illustration, and it will be understood that those skilled in the art to which the present disclosure pertains may easily transform the present disclosure in other specific forms without departing from the technical spirit or essential features thereof. Therefore, it should be understood that the above-described exemplary embodiments are illustrative in all respects and not restrictive. For example, each component described as a single type may be implemented in a distributed manner, and similarly, components described as distributed may be implemented in a combined form.

The scope of the present disclosure is indicated by the following claims rather than the above detailed description, and all changes or modifications derived from the meaning and scope of the claims and equivalent concepts should be interpreted as being included in the claims of the present disclosure.

What is claimed is:

1. A personal information security system ensuring irreversibility and similarity, the personal information security system comprising:
   a processor configured to execute predetermined processes;
   a memory configured to store programs and data;
   a communication module configured to receive user modality information by communicating with external devices;
   wherein the processor:
     extracts a feature vector (x) from the user modality information;
     generates a plurality of sub-vectors (u and v) by dividing the feature vector (x);
     obtains a plurality of parameters (A and B);
     generates a transformed template (y) by applying the plurality of sub-vectors and the plurality of parameters to an absolute value equations transformer (AVET),
     wherein the AVET derives the transformed template (y) by a sum of adding a result obtained by multiplying the parameter (A) by the sub-vector (u) to a result obtained by multiplying the parameter (B) by an absolute value of a product of the parameter (R) and the sub-vector (v), under a condition $R \cdot v \neq u$, and
     wherein the feature vector is unable to be predicted reversely by the transformed template (y), whereby the user modality information can be secured.

2. The personal information security system of claim 1, wherein the
   plurality of sub-vectors have equal sizes.

3. The personal information security system of claim 2, wherein the processor samples an independent and identically distributed mapping matrix on the basis of a Gaussian distribution.

4. The personal information security system of claim 1, wherein, in the AVET, an NP-hard problem is established according to a condition determined on the basis of the sub-vector (u), the sub-vector (v), and the feature vector (x).

5. The personal information security system of claim 1, wherein the processor further determines
whether to preserve data similarity, when the AVET is performed, according to a similarity between a Euclidean distance before performing the AVET and a Euclidean distance after performing the AVET.

6. The personal information security system of claim 1, wherein the user modality information includes bimodal modality information, and
wherein the processor extracts the sub-vector (u) from first modality information among the bimodal modality information; and the sub-vector (v) from second modality information among the bimodal modality information.

7. The personal information security system of claim 1, wherein the user modality information includes multimodal modality information, and
wherein the processor
extracts an integrated feature vector by generating q feature vectors from q pieces of modality information (where q is a natural number greater than or equal to 3) and concatenating the q feature vectors;
divides the integrated feature vector into a plurality of the sub-vectors;
generates a core tensor by using the sub-vectors on the basis of a fusing algorithm;
generates a core vector from the core tensor; and
performs the AVET by using the core vector as the feature vector.

8. A personal information security method that ensures irreversibility and similarity and is performed by a personal information security system including a processor, the personal information security method comprising:
extracting, by the processor, a feature vector (x) from user modality information;
generating a plurality of sub-vectors (u and v) by dividing the feature vector (x);
obtaining a plurality of parameters (A and B);
generating, by the processor, a transformed template (y) by applying the sub-vectors and the plurality of parameters to an absolute value equations transformer (AVET),
wherein the AVET derives the transformed template (y) by a sum of adding a result obtained by multiplying the parameter (A) by the sub-vector (u) to a result obtained by multiplying the parameter (B) by an absolute value of a product of the parameter (R) and the sub-vector (v), under a condition R·v≠u, and
wherein the feature vector is unable to be predicted reversely by the transformed template (y), whereby the user modality information can be secured.

9. The personal information security method of claim 8, wherein the
plurality of sub-vectors have equal sizes.

10. The personal information security method of claim 8, wherein, in the AVET, an NP-hard problem is established according to a condition determined on the basis of the sub-vector (u), the sub-vector (v), and the feature vector (x).

11. The personal information security method of claim 8, further comprising:
determining whether to preserve data similarity for the AVET according to a similarity between a Euclidean distance before performing the AVET and a Euclidean distance after performing the AVET.

12. The personal information security method of claim 8, wherein obtaining of the plurality of parameters comprises sampling an independent and identically distributed mapping matrix on the basis of a Gaussian distribution.

13. The personal information security method of claim 8, wherein the user modality information includes bimodal modality information, and
wherein the personal information security method further comprises:
extracting the sub-vector (u) from first modality information among the bimodal modality information and extracting the sub-vector (v) from second modality information among the bimodal modality information.

14. The personal information security method of claim 8, wherein the user modality information includes multimodal modality information, and
wherein the personal information security method comprises:
extracting, by the processor, an integrated feature vector by generating q feature vectors from q pieces of modality information (where, q is a natural number greater than or equal to 3), concatenating the q feature vectors, dividing the integrated feature vector into a plurality of the sub-vectors, generating a core tensor by using the sub-vectors on the basis of a fusing algorithm, and generating a core vector from the core tensor;
performing, by the processor, the AVET by using the core vector as the feature vector.

15. A non-transitory computer-readable recording medium storing a program to execute, on a computer, the method of claim 8.

* * * * *